Jan. 2, 1945.  C. P. BERG  2,366,233
HIGH VOLTAGE FUSING TOOL
Filed March 21, 1944  2 Sheets-Sheet 1
Fig. 1.
Fig. 2.
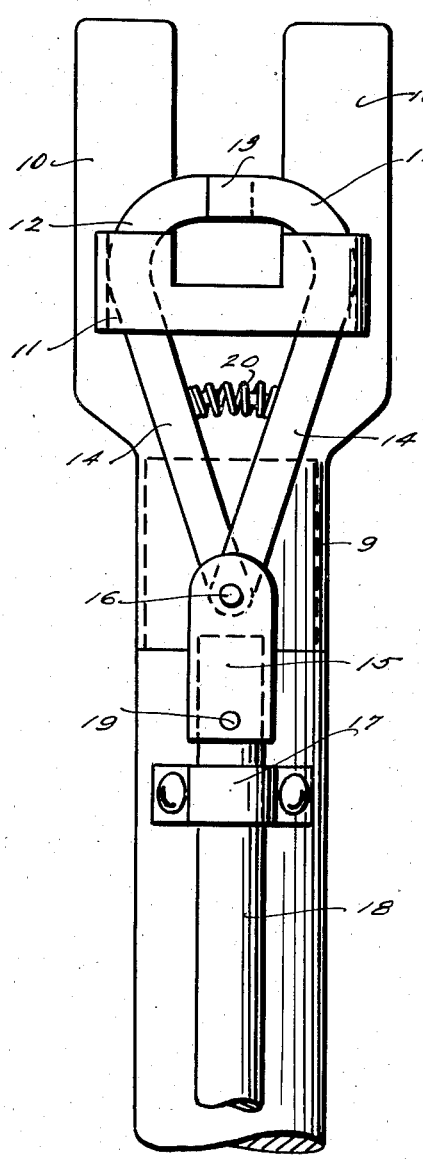
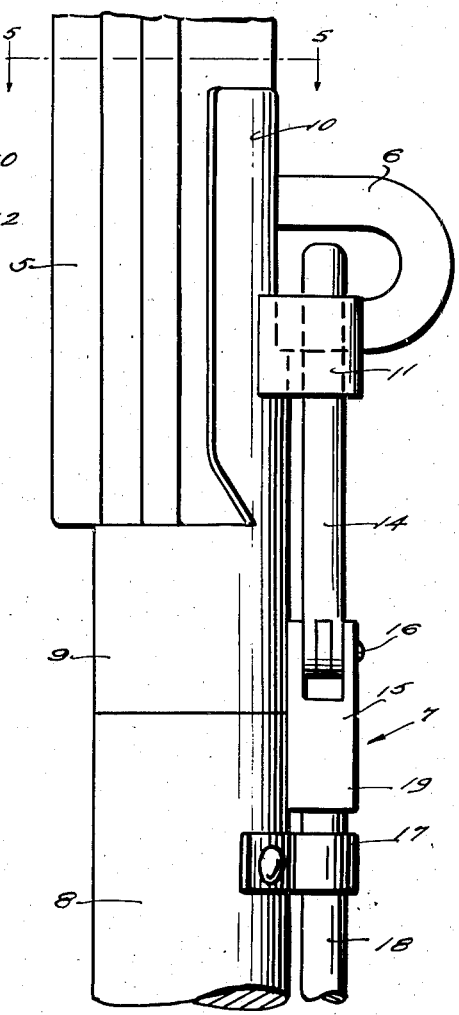
Inventor
Chester P. Berg
By Clarence A. O'Brien
and Harvey B. Jacobson
Attorneys Jan. 2, 1945.  C. P. BERG  2,366,233
HIGH VOLTAGE FUSING TOOL
Filed March 21, 1944   2 Sheets-Sheet 2
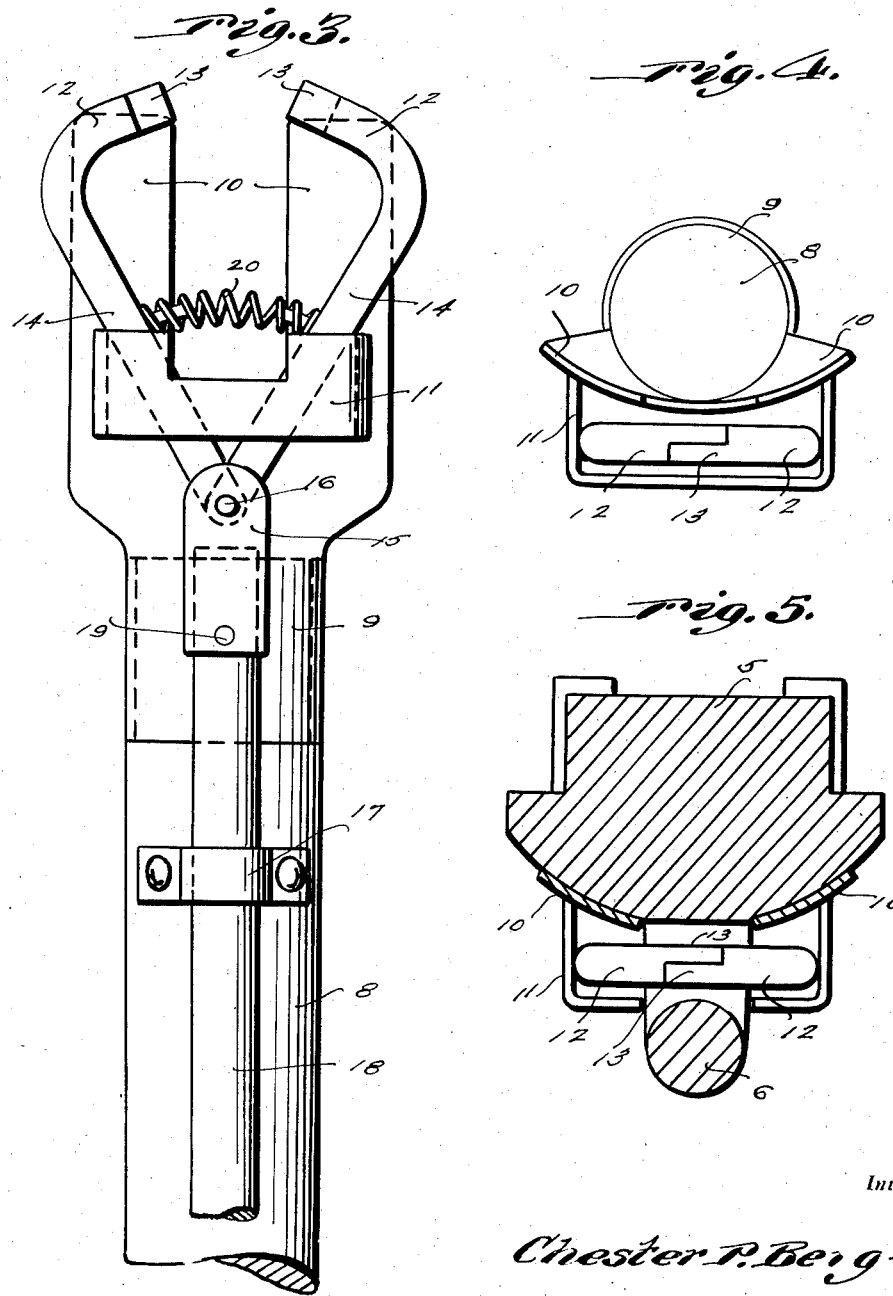
Inventor
Chester P. Berg
By Clarence A. O'Brien
and Harvey B. Jacobson
Attorneys Patented Jan. 2, 1945

2,366,233

UNITED STATES PATENT OFFICE 2,366,233

HIGH VOLTAGE FUSING TOOL

Chester P. Berg, Litchfield, Minn.

Application March 21, 1944, Serial No. 527,494

2 Claims. (Cl. 294—19)

This invention relates to new and useful improvements in tools or implements for replacing the usual cut-out door on high voltage fuse cutouts.

The principal object of the present invention is to provide an implement of the character described which can be used to considerable advantage by linemen and other workmen who may be engaged in refusing high voltage cut-outs.

Other objects and advantages of the invention will become apparent to the reader of the following description.

In the drawings—

Figure 1 represents a fragmentary front elevational view of the upper portion of the implement.

Figure 2 is a fragmentary side elevational view showing the implement engaged with a cut-out door.

Figure 3 is a fragmentary front elevational view of the upper portion of the implement with the jaws in open position.

Figure 4 is a top plan view of the implement with the jaws in the position shown in Figure 1.

Figure 5 is a horizontal sectional view taken substantially on the line 5—5 of Figure 2.

Referring to the drawings wherein like numerals designate like parts, it can be seen that numeral 5 denotes a cut-out door having the usual eye 6.

Numeral 7 generally refers to the improved implement which consists of an elongated pole 8 preferably of wood or some suitable insulation. The upper portion of this pole 8 is reduced and over this is slipped a ferrule 9 upwardly from which projects a pair of transversely arcuate wing-members 10 spaced horizontally as shown in Figure 1 to receive the eye 6 of the cut-out door 5.

A U-shaped contractor 11 has its ends welded or otherwise secured to the wing members 10. A pair of arcuate-shaped jaws 12, 12 having interlapping end portions 13 are provided with straight shanks 14 pivotally connected together and within the bifurcated upper end of a connector 15, as at 16.

Slidable through suitable guides 17 on the pole 8 is an elongated rod 18 of wood or some other insulation, the upper end of this rod 18 being secured as at 19 within the connector 15.

A coiled compression spring 20 is interposed between the shanks 14, 14, as shown in Figure 1 so as to separate the jaws when the rod 18 is pushed upwardly.

It can be seen, that cut-out door can be reached from a distance, depending upon the length of the pole 8.

The cut-out door 5 can be easily manipulated by straddling the eye 6 of the door with the wing members 10 and with the jaws 12 in the open position shown in Figure 3. By pulling downwardly on the rod 18, the jaws are caused to contract as they move through the contractor 11, thus closing the jaws to form a link, linked with the eye 6. The tool thus connected to the door 5 can be manipulated to properly adjust the door.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An implement of the character described comprising a head structure, an elongated pole, a gripping device on the head and means extending along the pole for operating the gripping device, said gripping device consisting of a pair of pivotal jaws, spring means for spreading the jaws and contracting means for contracting the jaws when the means extending along the pole is operated.

2. An implement of the character described comprising a head structure, an elongated pole, a gripping device on the head, and means extending along the pole for operating the gripping device, said gripping device consisting of a pair of pivotal jaws, spring means for spreading the jaws, and contracting means for contracting the jaws when the means extending along the pole is operated, said contracting means comprising a member on the head through which said jaws are slidably extended and acting to cam said jaws together.

CHESTER P. BERG.